UNITED STATES PATENT OFFICE.

CHRISTOPHER RIS, OF BASLE, SWITZERLAND, ASSIGNOR TO JOHN R. GEIGY & CO., OF SAME PLACE.

BLACK TRISAZO DYE AND PROCESS OF MAKING SAME.

SPECIFICATION forming part of Letters Patent No. 619,503, dated February 14, 1899.

Application filed August 3, 1898. Serial No. 687,594. (No specimens.)

*To all whom it may concern:*

Be it known that I, CHRISTOPHER RIS, a citizen of the Republic of Switzerland, residing at Basle, in said Republic, have invented certain new and useful Improvements in Processes of Producing a Black Trisazo Color, of which the following is a specification.

This invention, which has been patented in France (certificat d'addition du 5 Janvier, 1898, au brevet No. 270,151) and in England, (forming part of complete specification, filed June 2, 1898, Patent No. 20,278/97,) relates to the production of new black trisazo coloring-matters corresponding to the following formula:

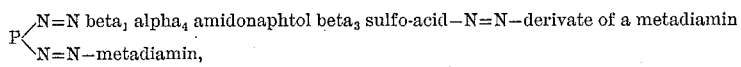

which are produced by diazotation of the so-called "intermediary" compounds from one molecule of a paradiamin, such as tolidin or paraphenylenediamin, and one molecule of $beta_1$ $alpha_4$ amidonaphthol $beta_3$ sulfo-acid and combination of the thus formed tetrazo compounds first with a derivate of a metadiamin and then with a metadiamin itself.

As derivates of metadiamins there may be employed metaphenylenediaminsulfo-acid, metatoluylenediaminsulfo-acid, nitro-metaphenylenediamin, chrysoidins (such as anilinsulfo-acid-azo-metaphenylenediamin, para-amidosalicylic-acid-azo-metaphenylenediamin, naphthylaminsulfo-acid-azo-metaphenylenediamin) a sulfo-acid of Bismark brown. For instance:

I. 21.5 kilograms of tolidin are dissolved in about twelve hundred liters of water with sixty kilograms of hydrochloric acid of 21° Baumé and diazotized at about 0° centigrade with fourteen kilograms of sodium nitrite. Then combined in alkaline solution with twenty-four kilograms of $beta_1$ $alpha_4$ amidonaphthol $beta_3$ sulfo-acid. Then the intermediary diazo-azo compound is acidulated with hydrochloric acid and further diazotized with seven kilograms of sodium nitrite and combined with twenty kilograms of metatoluylenediamin-sulfo-acid in a solution of sodium acetate. Then a solution of eleven kilograms of metaphenylenediamin is added and the whole mass heated to boil, after adding the necessary quantity of sodium carbonate to keep it alkaline. The coloring-matter is salted out, filtered off, pressed, and dried.

II. The azo coloring-matter resulting from the combination of fifteen kilograms of acet-paraphenylenediamin with twenty-four kilograms of $beta_1$ $alpha_1$ amidonaphthol $beta_3$ sulfo-acid is saponified by heating it with caustic soda-lye of about ten per cent., then acidulated with hydrochloric acid and diazotized at about 0° centigrade with fourteen kilograms of sodium nitrite, then combined in a solution of sodium acetate with twenty-four kilograms of the chrysoidin from para-amidosalicylic acid and metaphenylenediamin. Then a solution of eleven kilograms of metaphenylenediamin (or of twelve kilograms of metatoluylenediamin) is added, and finally treated as described in Example I.

The new coloring-matter forms an amorphous black powder, soluble in water with reddish-black to greenish-black color, and in concentrated sulfuric acid with dark-blue color. It is difficultly soluble in alcohol, and insoluble in benzene. It dyes unmordanted cotton and mixed goods, such as half-wool and half-silk, deep-black shades.

Having thus described my invention, I claim as new and desire to secure by Letters Patent—

1. The process of making new black colors by diazotation of the intermediary compounds from one molecule of a paradiamin and one molecule of $beta_1$ $alpha_4$ amidonaphthol $beta_3$ sulfo-acid, and then combination of the formed tetrazo body with one molecule of a derivate of a metadiamin and one molecule of a metadiamin, substantially as described.

2. The new black color, possessing the following formula:

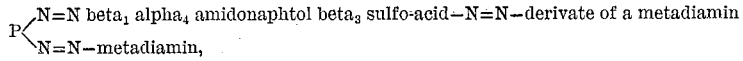

which forms an amorphous black powder, soluble in water with reddish-black to greenish-black color, in concentrated sulfuric acid with dark-blue color, difficultly soluble in alcohol, insoluble in benzene and which dyes unmordanted cotton in deep-black shades, substantially as described.

In testimony that I claim the foregoing as my invention I have signed my name in presence of two subscribing witnesses.

CHRISTOPHER RIS.

Witnesses:
GEORGE GIFFORD,
ALBERT GRAETER.